US006480188B1

(12) United States Patent
Horsley

(10) Patent No.: US 6,480,188 B1
(45) Date of Patent: Nov. 12, 2002

(54) THUMBWHEEL SELECTION SYSTEM

(75) Inventor: Brian Horsley, Escondido, CA (US)

(73) Assignee: Digital On-Demand, Carlsbad, CA (US)

( * ) Notice: Subject to any disclaimer, the term of this patent is extended or adjusted under 35 U.S.C. 154(b) by 0 days.

(21) Appl. No.: 09/655,569

(22) Filed: Sep. 6, 2000

(51) Int. Cl.[7] .......................... G09G 5/00; G06F 17/60
(52) U.S. Cl. ....................... 345/184; 345/784; 345/830; 345/173
(58) Field of Search .................... 345/173, 174, 345/176, 178, 184, 738, 739, 830, 784, 785, 786, 787, 788, 789, 156, 157, 200, 163, 169; 705/26, 27; D14/900, 901, 902; 341/35

(56) References Cited

U.S. PATENT DOCUMENTS

| 5,481,264 A | * | 1/1996 | Kim .............................. 341/35 |
| 5,530,455 A | * | 6/1996 | Gillick et al. ................ 345/163 |
| 5,563,631 A | * | 10/1996 | Masunaga .................... 345/169 |
| 5,615,346 A | * | 3/1997 | Gerken ........................ 345/786 |
| 5,640,193 A | * | 6/1997 | Wellner ........................ 705/26 |
| 5,825,353 A | * | 10/1998 | Will ............................. 345/184 |
| 5,845,261 A | * | 12/1998 | McAbian ..................... 705/26 |
| 5,970,471 A | * | 10/1999 | Hill ............................. 705/26 |
| 5,992,752 A | * | 11/1999 | Wilz, Sr. et al. ......... 235/472.01 |
| 6,008,803 A | * | 12/1999 | Rowe et al. ................ 345/830 |
| 6,034,688 A | * | 3/2000 | Greenwood et al. ........ 345/784 |
| 6,104,334 A | * | 8/2000 | Allport ................... 340/825.24 |
| 6,256,019 B1 | * | 7/2001 | Allport ........................ 345/156 |

* cited by examiner

Primary Examiner—Steven Saras
Assistant Examiner—Paul A. Bell
(74) Attorney, Agent, or Firm—Fitzpatrick, Cella, Harper & Scinto

(57) ABSTRACT

A system and method for use in retail stores for selecting, previewing, and purchasing music or other products is provided. The graphical information system provides a user with the ability to locate products through an interface that combines the use of mechanical wheels with a touch screen whereby rotation of the mechanical wheels, or thumbwheels, appears on screen to rotate a series of mechanical type drums. The system provides a user with the functionality and entertainment value of a kiosk coupled with a powerful method of selecting products from a large catalog using thumbwheels in conjunction with a hierarchical graphical user interface tailored for the specific retail environment.

16 Claims, 2 Drawing Sheets

THUMBWHEEL SELECTION SYSTEM

BACKGROUND OF THE INVENTION

1. Field of the Invention

The present invention relates generally to the art of a system for selecting, previewing, and purchasing music and other products, and more specifically to a user interface employing mechanical wheels in conjunction with a touch screen, thereby enabling expedient product location.

2. Description of the Related Art

A user purchasing an item in a department store or other retail outlet is presented with only a certain amount of information. For example, a user may enter a retail music store and wish to purchase the latest CD by her favorite singer and a DVD of an action-adventure movie. Such a user must go to the proper section, locate the CD, ask to listen to the CD if desired, and purchase the CD. If the CD is missing, she has taken time to travel to the retail location and may walk away without the desired product. The user may go to the DVD section and search through the titles in the manner they are listed, which is frequently alphabetical and not by genre. Thus the user may not be able to readily locate her selection, and may not have all of the information she desires, such as a preview of the desired CD or the ability to purchase the product she wants.

Certain retail locations have attempted to solve the problem of inefficient information by employing point-of-purchase devices, such as a computer touch screen having listings of particular products sold at the retail location. The problem with these systems is that the user interface, or the ability for a user to locate the desired material, can be awkward or inefficient. A typical touch screen point of purchase system requires that the user type in the information he desires, which can be slow and clumsy. Alternately, certain pointing devices similar to a computer mouse have been employed, but in this scenario all of the choices must be presented and selectable by the user, and the user may have to penetrate several levels of menus to find the desired materials. Also, pointing devices can be inexact. The general drawback associated with these types of in-store systems is that they are slow and awkward to use, and are not as desirable to people accustomed to the rapid feedback associated with, for example, the internet. Further, the search methods tend to be either exhaustive in the sense that all of the titles are made available in one large database, such as alphabetical, or they are not necessarily inherently categorized, such as by genre or other logical category.

The older systems also tend to be stand-alone type systems in the sense that information is loaded or entered into the system and does not readily offer an ability to update. For example, a new DVD is only entered on the system once the CD has been categorized by the system originator, placed in a format acceptable to the system, and loaded on to the system, which may take weeks after the item becomes commercially available.

As improvements in technology result in more compact and more efficient devices, a wide variety of applications, products, and users continue to emerge. With the expansive growth of electronic commerce over the Internet, many consumers have familiarized themselves with making purchases through "one-click" type systems. The typical user is more attuned to a rapid presentation of information and selection capability.

It is therefore an object of the current invention to provide an efficient, user-friendly product search and/or retrieval system and method for use in retail stores.

It is a further object of the current system to provide a system that enables a consumer to select, preview, and purchase products such as music in a fast and attractive format.

It is a further object of the current invention to provide a system that can be employed in connection with a high-speed network connecting retailers to a centralized storage repository for distribution that provides a relatively efficient means for storing, retrieving, and updating information for use by a consumer in a retail environment.

SUMMARY OF THE INVENTION

The present invention is directed to a system and method for selecting, previewing, and purchasing music and other products is disclosed. In particular, the system relates to a unique interface that combines the use of mechanical thumbwheels with a touch screen such that a user rotating one of the plurality of thumbwheels views a graphical representation of selections rotating in a fashion resembling a mechanical drum. The system uses a hierarchical selection method to provide a user with the ability to locate products expediently.

These and other advantages of the present invention will become apparent to those skilled in the art from the following detailed description of the invention and the accompanying drawings.

DETAILED DESCRIPTION OF THE INVENTION

Embodiments of the present invention relate to a device for use in retail stores for selecting, previewing, and purchasing music that is equally applicable to use with other products, including but not limited to catalog items, components, tickets, and the like. In one embodiment, the graphical interface system provides a user with the ability to locate products quickly through an interface that combines the use of mechanical wheels with a touch screen having the ability to graphically depict a rolling drum type of visual on-screen representation.

Figure 1:
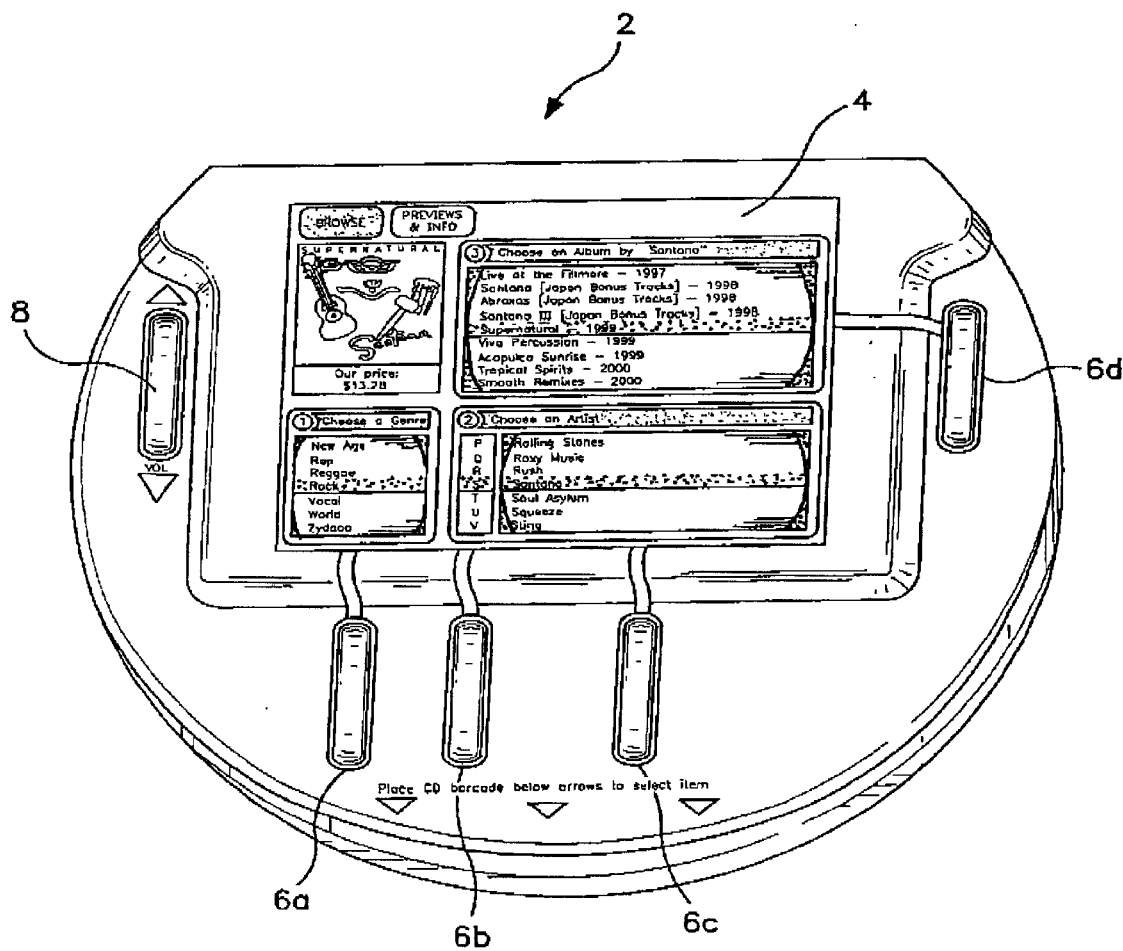
FIG. 1 is an illustration of a graphical interface consisting of a touch screen, thumbwheels, and volume control.

FIG. 1 illustrates a graphical interface system 2 having a touch screen 4, thumbwheels 6a–6d, and volume control 8. Through use of the graphical interface system 2, a user encounters the functionality and entertainment value of a single station unit, such as a kiosk, coupled with a unique, powerful, and attractive method of selecting products from a voluminous catalog using thumbwheels 6a–6d.

The number of thumbwheels 6a–6d offering interaction with the screen as shown in FIG. 1 is four. It is understood that the number of thumbwheels employed in the inventive graphical interface system shown herein may vary in number, quality, or orientation while still within the scope of the current invention. For example, an automobile parts retailer may wish to offer three thumbwheels, while a general retailer such as Sears or Wal Mart may wish to offer five. The number of thumbwheels is dependent upon the desires of the retailer and the inherent nature of the products being offered for previewing, such as the means by which the products can be logically categorized and graphically offered to users in an efficient and attractive arrangement.

A user approaching the graphical interface system initially encounters a plurality of areas on the screen of the device. In the embodiment shown in FIG. 1 the user encounters a total of four areas. Rather than being presented with a touch screen keyboard, or pointing device such as a trackball or mouse, the graphical user interface employs the thumbwheels 6a–6d, which may be manually rotated by the user.

Thumbwheels 6a–6d operate in conjunction with the graphical interface system 2. A previously known system for use in connection with selection of items in a retail environment is the kiosk, which is a standalone physical unit having display capability and data contained therein. Such a standalone kiosk system may use a network to connect multiple kiosks residing in various locations to provide for centralized reporting and simple updating. Standalone kiosks may also not be networked, but such systems can be difficult to update on a regular basis. The present system permits the graphical information system 2 to exchange information over touch screen 4, and the graphical information system 2 contains all of the beneficial elements traditionally associated with a kiosk. The present system includes, for example, the means for and the ability to select items and the ability to view alternate screens. While the inventive arrangement may be used without touch screen 4, the inclusion of touch screen 4 provides the ability for a user to select items and easily navigate screens.

As a user turns one of the four thumbwheels 6a–6d, the selection on touch screen 4 moves in a manner imitating a physical drum thereby providing a familiar metaphor to the user. Thus rotation of the one of the thumbwheels 6 provides an on-screen rotation of a graphical element on screen. The correlation between turning a thumbwheel and motion on screen of a drumlike element may be a one-to-one correspondence, or any other multiple fitting to the situation. For example, rotation through four genres may require a different thumbwheel-onscreen drum element relationship than rotation through thousands of parts in a parts catalog. This real-time coupling between the motion of thumbwheel 6 and the apparent rotation of the drum on touch screen 4 provides a unique selection mechanism that is easily understood by a user, attractive to a person passing the graphical information system in a store, and offers an efficient means for locating a desired product depending on the categorizations offered.

Thumbwheels 6a–6d are preferably digital and have no stops. If a user rolls off of the top or bottom of a list, the list preferably "wraps around" as it would on a tangible drum. Depending on the application, the list may simply end. Thumbwheels 6a–6d have indents so as to provide a user with tactile feedback. As noted above, while a direct correlation between thumbwheel positions and the items, elements, or selections presented is not required, it is preferable to offer a one-to-one correspondence between onscreen elements on touch screen 4 and indents or positions on each thumbwheel.

The use of multiple thumbwheels 6a–6d enhances the fast selection of items from expansive catalogs. For ultimate performance, thumbwheels 6a–6d may be used in a hierarchical fashion. The system is used to select, preview, and purchase an item, such as music. In such an arrangement, thumbwheels 6a–6d may each be used to represent genre, first letter of the artist name, artist name, and available compact disc (CD) titles. This ordering is representative of one way of physically ordering conventionally used on racks within a retail music department. Since the arrangement of data has similarities to the arrangement of physical goods in a store or in a paper catalog, almost any user would find the mechanism intuitive and inviting. The system may be used for browsing any large collection of items such as, but not limited to, books, movies, music, and hard goods.

Figure 2:
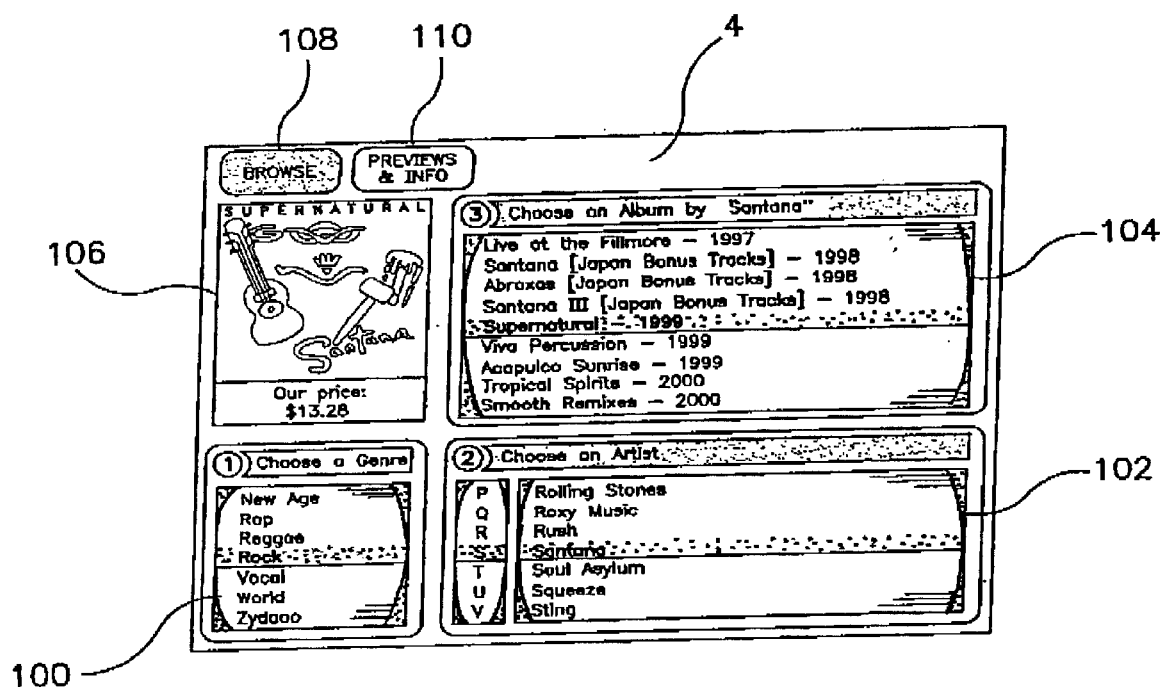
FIG. 2 is a graphical interface illustrating clearly labeled selection windows.

To more clearly understand the embodiments contained herein, FIG. 2 illustrates clearly labeled selection windows that display, to a user, the selection process. FIG. 2 depicts graphical interface 2 in a state whereby a user has turned first thumbwheel 6a such that the simulated rolling drum in first selection window 100 points to "Rock." This causes artists and titles from the rock genre to be displayed in other selection windows 102 and 104. The system then provides the user with the ability to turn a second thumbwheel 6b to cause the middle-simulated drum to display the letter "S." This causes all rock artists whose names begin with the letter S to be displayed in selection window 102. First or last name can be offered depending on the desires of the retailer or system administrator. The user may then utilize a third thumbwheel 6c to rotate the third simulated drum to select, for example, "Santana." This then causes a list of all of Santana's albums to appear in selection window 104. The user may then use a fourth thumbwheel 6d to select "Supernatural 1999." This causes a display of the Supernatural album cover 106 to appear on the upper left of touch screen 4.

As may be appreciated by examination of FIG. 2, each simulated drum offers multiple selection options to a user, typically in the range of ten. Thus a user is preferably presented with multiple selections in the range of the present selection, where the number of available selections can vary depending on the quantity of candidate selections, and the desires of the system administrator and retailer.

Using this implementation offers a hierarchical arrangement of information applicable to virtually any type of retail catalog of products or services. In the example above, the top level is "genre", followed at the next level by the initial letter of the artist's name, followed at the next level by the artist's name, followed at the fourth level by the CDs or albums associated with that artist. Other arrangements for music selections may be available, such as a sub-category within rock including "hard rock," "soft rock," "rockabilly," and so forth. As noted, systems for organizing and displaying products and services may employ similar types of hierarchical arrangements while still within the scope of the invention. By way of example and not limitation, an automobile parts graphical interface system 2 may use a top level of type of car (Ford), a second level of model of car (Mustang convertible), a third level of broad category of part (engine, drive train, interior, and so forth) a fourth level narrow category of part (for interior, steering wheel, seats, radio/CD/tape system, pedals, etc.) and a final fifth hierarchical level of actual part description or part number. Such a system could display to the user a picture or photograph of the part desired in selection window 104.

In the music example, if the user wishes to obtain information about the Santana Supernatural 99 album after locating it in the manner noted above, the user may then tap touch screen 4 button labeled "Preview and Info 110." Alternately, a physical selection button or other selecting device may be provided. A different screen is then presented that displays information about the album. In addition, the user is provided with the ability to use the thumbwheels 6 or touch screen 4 to select individual tracks for listening.

An additional feature of the current graphical interface system is a barcode scanner mounted under or proximate the device. If a user scans a physical item such as a CD or DVD using this barcode scanner, the simulated drums move relatively instantaneously to that item. This feature provides the user with instant access to routine data or additional information about the item. Furthermore, because of the nature of the device, it also shows the user similar items that may be of interest. The rotation of the drums to the desired position upon scanning an item provides a list of adjacent items, such as other albums or CDs by this artist or other artists having names with the same first letter of the alphabet, such as other rock artists whose name begins with the letter S.

Note that when the system has not selected an individual item, such as the Santana Supernatural 99 album or CD, the area on the touch screen remains blank or includes generic graphic or text material, such as the name of the retailer or system administrator. Alternately, selection at different levels can provide for the system to display different graphics or text on selection of the desired information. In the present example, a user selecting "Rock" at the first "genre" hierarchical level may be presented with a graphic associated with Rock music, while selecting the letter "S" at the second level and the name "Santana" at the third level may result in display of a picture of Carlos Santana. The system utilizes software having the ability to seamlessly display the rotating drum type graphic in the touch screen area, including the appearance of slight protrusion of the purported drum with optional shadowing. The software for the system is therefore able to graphically replicate rotating graphics corresponding to the turning of each thumbwheel, such as the type of graphical presentation used in many newer Las Vegas style slot machines.

The touch screen employed is a typical touch screen with areas of sensing touch corresponding to the desired selectability by the user, such as the BROWSE 108 area, PREVIEWS & INFO 110 area, and optionally the graphic area representing the available selection. Other areas may be available for touch by the consumer, such as the windows corresponding to the available selections, such as genre, artist letter, artist name, and album by the artist.

There is optionally presented, as shown by the graphic of FIG. 1, a volume control 8 thumbwheel for use by a user desiring to preview a song or selection. In the Santana sample, a user desiring to hear the first track of the Supernatural 99 CD selects the track which begins playing and alters the volume to suit his desire.

While the invention has been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A system for use in a retail store for selecting, previewing, and purchasing products, the system comprising a graphical interface that includes:
    a touch screen; and
    a plurality of mechanical selection wheels,
    wherein the mechanical selection wheels provide for selection from among a predetermined hierarchical grouping of products using the graphical interface and resembling at least one rotating drum, and
    wherein each of the mechanical selection wheels provides for selection from different portions of the touch screen, respectively.

2. The system of claim 1, wherein use of the touch screen enables a user to select items and navigate screens.

3. The system of claim 1, wherein the plurality of mechanical selection wheels is a plurality of thumbwheels.

4. The system of claim 3, wherein the plurality of thumbwheels are used to represent categories corresponding to one or more of genres, first letters of names, names, and titles.

5. The system of claim 3, wherein multiple thumbwheels are used hierarchically to enhance speed in selection of items from expansive catalogs.

6. The system of claim 3, wherein the plurality of thumbwheels are digital and have no stops.

7. The system of claim 3, wherein the plurality of thumbwheels are formed with indents that provide tactile feedback to a user.

8. The system of claim 1, wherein motion of a mechanical selection wheel causes a corresponding portion of the touch screen to scroll upwards or downwards in accordance with the motion.

9. The system of claim 1, further comprising a volume control, wherein the volume control varies from 1.0 to 10.0.

10. The system of claim 1, wherein a barcode scanner is incorporated to provide a user with instant selection of a scanned item, so that the user may preview that item and quickly locate similar items.

11. The system of claim 1, wherein the different portions of the touch screen are selection windows displaying a selection category and at least one subcategory.

12. The system of claim 1, whereby an arrangement of data on the touch screen is analogous to an arrangement of physical goods found in one or more of a retail store and a paper catalog.

13. A method for selecting, previewing, and purchasing items, the method comprising the steps of:
    providing thumbwheels in conjunction with a graphical interface to hierarchically select from a series of items, wherein the thumbwheels operate to visually appear to turn a series of items resembling mechanical rotatable drums; and
    providing a touch screen to enable a user to select one or more items and to navigate a multitude of screen portions,
    wherein each of the thumbwheels provides for selection from different screen portions of the touch screen, respectively.

14. The method of claim 13, wherein motion of a thumbwheel causes a corresponding screen portion of the touch screen to scroll upwards or downwards in accordance with the motion.

15. The method of claim 13, wherein the screen portions of the touch screen correspond to selection windows displaying a selection category and at least one subcategory.

16. The method of claim 13, wherein the thumbwheels are used to represent categories corresponding to one or more of genres, first letters of names, names, and titles.

\* \* \* \* \*